United States Patent [19]

Babitzka et al.

[11] Patent Number: 4,522,174
[45] Date of Patent: Jun. 11, 1985

[54] METHOD FOR THE INJECTION OF FUEL AND FUEL INJECTION APPARATUS FOR PERFORMING THE METHOD

[75] Inventors: Rudolf Babitzka, Kirchberg; Ernst Linder, Mühlacker, both of Fed. Rep. of Germany

[73] Assignee: Robert Bosch GmbH, Stuttgart, Fed. Rep. of Germany

[21] Appl. No.: 559,118

[22] Filed: Dec. 7, 1983

[30] Foreign Application Priority Data

Dec. 31, 1982 [DE] Fed. Rep. of Germany ....... 3248713

[51] Int. Cl.³ ............................................. F02B 3/00
[52] U.S. Cl. .................................. 123/300; 123/305; 123/502; 123/450; 123/458
[58] Field of Search ............... 123/299, 300, 305, 501, 123/502, 450, 446, 458, 459, 460

[56] References Cited

U.S. PATENT DOCUMENTS

| | | | |
|---|---|---|---|
| 2,431,857 | 12/1947 | Fenney | 123/305 |
| 2,724,371 | 11/1955 | Mallory | 123/305 |
| 4,224,903 | 9/1980 | Mowbray | 123/300 |
| 4,351,295 | 9/1982 | Bassoli et al. | 123/300 |
| 4,463,727 | 8/1984 | Babitzka et al. | 123/458 |

OTHER PUBLICATIONS 237472, 5/1943, Alien Property Custodian, Scherenberg.

Primary Examiner—Magdalen Y. C. Moy
Attorney, Agent, or Firm—Edwin E. Greigg

[57] ABSTRACT

A method for injecting fuel directly into a given combustion chamber of an internal combustion engine with externally supplied ignition in which the supply of air to the combustion chambers may be either throttled or unthrottled. To assure unobjectionable operation both at partial load and under full load, the fuel is introduced during partial-load operation with a large air excess, forming a layered charge, in the vicinity of the ignition location at a time immediately prior to the instant of ignition, while at full-load operation, in order to attain maximum power and soot-free combustion by means of a homogeneous fuel-air mixture, the supply of fuel takes place during the intake stroke of the engine piston defining the combustion chamber. In order to perform this method, a distributor-type fuel injection pump is provided, in which either one distributor opening or another distributor opening of two distributor openings comes into effective operation. The distributor openings are located at a fixed rotational angle spacing from one another, by means of which the advancement of the fuel injection at full load is fixed relative to the instant of injection at partial load.

7 Claims, 7 Drawing Figures

Fig. 1
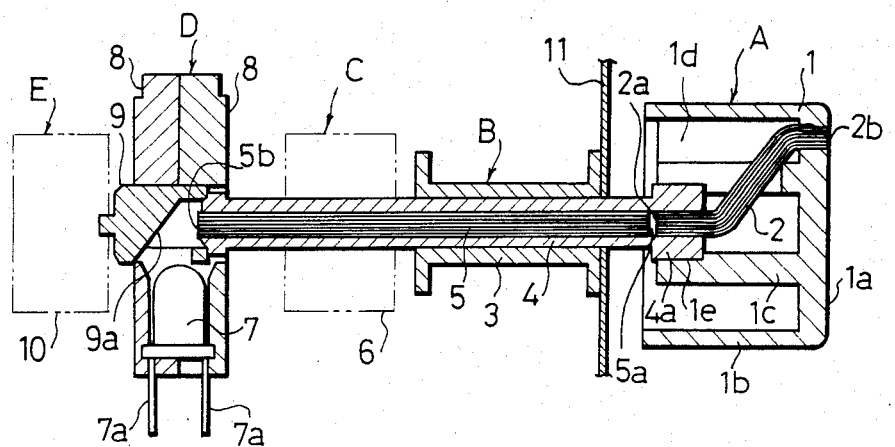
Fig. 2
Fig. 3
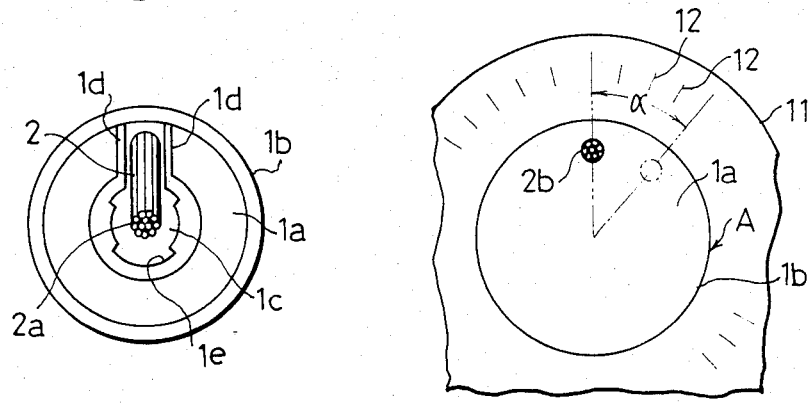

ILLUMINATION TYPE ROTARY VARIABLE RESISTOR

FIELD OF THE INVENTION

The present invention relates to a rotary variable resistor.

SUMMARY OF THE INVENTION

An object of the present invention is to provide a rotary variable resistor which can actuate a switch mechanism by axial movement of its operation knob and yet can provide a light spot indicating the rotary position of the knob.

BRIEF DESCRIPTION OF THE DRAWINGS

FIG. 1 a side cross-section of the illumination type rotary variable resistor according to an embodiment of the present invention;

FIG. 2 is a view of the knob portion of FIG. 1 when viewed from the back side of the knob portion;

FIG. 3 is a view of the knob portion of FIG. 1 when viewed from the front side of the knob portion;

DETAILED DESCRIPTION OF THE PREFERRED EMBODIMENT

Figure 4:
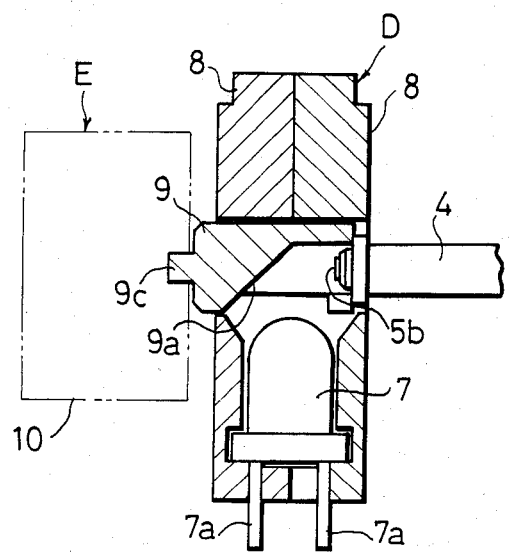
FIG. 4 is an enlarged side cross-section of the light source portion of FIG. 1.
Figure 5:
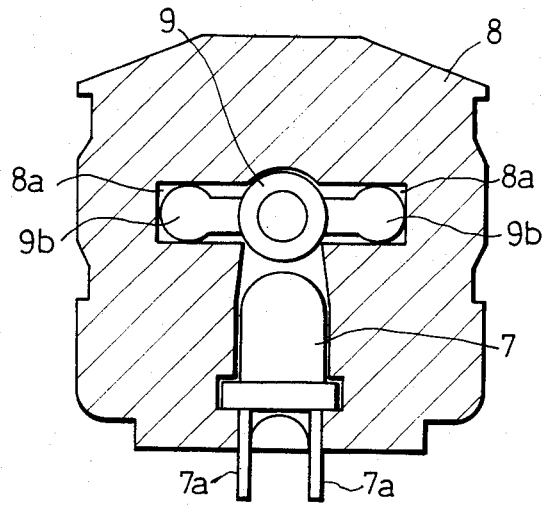
FIG. 5 is an enlarged front cross-section of the light source portion of FIG. 1.

Referring to FIGS. 1 to 5, a preferred embodiment of the present invention will be described hereunder.

In FIG. 1, the illumination type rotary variable resistor includes a knob section A, a shaft section B, a variable resistor section C, a light source section D and a switch section E.

The knob section A includes a knob 1 and a second photo-conductive element 2. The knob 1 has an end surface 1a and an annular jetty portion 1b extends rearwardly from the end surface 1a as shown in FIG. 1. The interior of the knob 1 include a cylindrical projection 1c formed coaxially with the annular jetty portion 1b, a pair of partitions 1d, 1d connected to the cylindrical projection 1c and a fitting hold 1e as shown in FIGS. 1 and 2. The second photo-conductive element 2 is disposed within the knob 1 as shown in FIGS. 1 and 2. In the knob 1, the second photo-conductive element 2 is bent such that the base end 2a thereof is disposed at the center of rotation of the knob 1 and the forward end 2b is disposed at a position on the end surface 1a which is radially offset from the center of rotation of the knob 1 so that a display can be made thereat. The shaft section B includes a shaft bearing 3, a hollow shaft 4 supported by the shaft bearing 3 for rotation as well as axial movement and a first photo-conductive element 5 as shown in FIG. 1. A flange 4a formed at the rightward end of the hollow shaft 4 in the drawing is fixed within the fixing hold 1e so that the hollow shaft 4 is rotated when the knob 1 is rotated and displaced leftwardly in the drawing when the knob 1 is pushed leftwardly. The right end 5a of the first photo-conductive element 1 is in opposition to the base end 2a of the second photo-conductive element 2 and the left end 5b of the first photo-conductive element 5 is in opposition to a reflex surface 9a of a driver 9 which will be described later.

The variable resistor section C is constituted by a variable resistor 6 the resistance of which varies when a slider slides on a resistive layer on an insulator substrate (all not shown). The slider is rotated by the rotation of the hollow shaft 4.

The light source section D is constituted by a light source 7 including an LED and provided with terminals 7a. A pair of casings 8, 8 made of a synthetic resin material such as PBT (polybutylene terephthalate) holds the light source 7, and the above-mentioned driver 9 is made of a synthetic resin material such as PBT inserted into the casings 8, 8 for sliding movement in the axial direction of the hollow shaft 4. The driver 9 is provided at its inside with the above-mentioned reflex surface 9a so that the light from the light source 7 disposed at a position perpendicular to the axis of the first photo-conductive element 5 is reflected by the reflex survace 9a to impinge onto the end surface 5b of the first photo-conductive element 5. On the outer periphery of the driver 9 are formed a pair of slide rods 9b, 9b which are slidably fitted into a pair of guide grooves 8a, 8a formed inside the insulating casings 8, 8 whereby the sliding distance of the driver 9 in the axial direction of the hollow shaft 4 is restricted. The forward end of the hollow shaft 4 is made to contact with the right end of the driver 9 so that the driver 9 moves in the axial direction of the hollow shaft as the hollow shaft 4 is moved axially.

The switch section E is formed by a switch 10, such as a push-push switch in which on and off states are alternatively attained by successively depressing an actuator (not shown). A push-momentary switch is held in the on-state when an actuator (not shown) is depressed, and the normal off-state is recovered when the actuator is released. The actuator (not shown) of the switch 10 is made to contact the projection 9c formed at the forward end of the driver 9, so that the actuation of the switch 10 is performed by the displacement of the driver in the axial direction of the hollow shaft 4.

Reference numeral 11 is a meter board and 12 a scale formed on the meter board.

In such an arrangement, when the knob 1 is rotated counterclockwise by an angle α as shown in FIG. 3, the forward end 2b of the second photo-conductive element 2 exposed on the end surface 1a of the knob 1 is also displaced to the position indicated by a phantom line as shown in FIG. 3. Being fixedly coupled with the knob 1, the hollow shaft 4 is also rotated by the angle α as the knob 1 rotates, so that the slider (not shown) of the variable resistor 6 is rotated by the rotation of the hollow shaft 4 to thereby vary the resistance value of the resistor.

The light from the light source 7 reflected onto the reflex surface 9a of the driver 9, impinges onto the end portion 5b of the first photo-conductive element 5, and is transferred to the forward end 2b of the second photo-conductive element 2 exposed on the end surface 1a of the knob 1 throught the first and second photo-conductive elements 5 and 2. Thus, the angle of rotation of the knob 1 is optically indicated at the end surface 1a of the knob 1 so that the resistance value of the variable resistor 6 and therefore a quantity, such as a sound volume, determined by the resistance value, can be diretly read out on the scale 12 of the meter board 11.

When the knob 1 is pushed toward the meter board 11, the hollow shaft 4 connected to the knob 1 and the driver 9 contacting the forward end of the hollow shaft 4 are displaced leftwardly in the drawing in the direction of thrust, so that the state of the switch 10 is changed by the forward end projection 9c of the driver 9. However, the light from the light source 7 can still be effectively reflected by the reflex surface 9a of the driver 9 toward the first photo-conductive element 5, even when the distance between the light source 7 and the end portion 5b of the first photo-conductive element 5 is changed by the displacement of the driver 9 in the direction of thrust. Then, when the knob 1 is released from the depression force, the driver 9 is returned rightwardly in the drawing by means of a return spring (not shown) provided in the switch 10, whereby the hollow shaft 4 and the knob 1 are returned to their original positions.

The illumination type rotary variable resistor according to the present invention is arranged, as described above, such that a rotatable hollow shaft displacable in its axial direction is coupled to a rotatable knob, and a photo-conductive element is disposed within the hollow shaft and the knob. One end of the photo-conductive element is exposed at an end surface of the knob, and a light source is provided close to the other end of the photo-conductive element. A driver member is placed in contact with a forward end of the hollow shaft to cause a switch to perform its switching operation, and a reflex surface is formed on the driver member to reflect light from the light source towards the photo-conductive element, so that the light from the light source can be displayed at the end surface of the knob by utilizing the reflex surface formed on the driver member on one hand even when the hollow shaft is displaced axially, and the switching operation of the switch is attained by the driver member.

What is claimed is:

1. An illumination type rotary variable resistor comprising a rotatable hollow shaft displaceable axially, a rotatable knob coupled to a forward end of said hollow shaft, a photo-conductive element disposed within said hollow shaft and said knob and having two ends one of which is exposed eccentrically at an end surface of said knob, a light source provided close to the other end of said photo-conductive element, a switch located rearwardly of said hollow shaft, a driver member disposed in contact with the rearward end of said hollow shaft to cause said switch to perform its switching operation upon axial movement of said hollow shaft, and means including, a reflective surface formed on said driver member to reflect light from said light source and to direct the reflected light towards said photo-conductive element regardless of the axial position of said hollow shaft.

2. An illumination type rotary variable resistor according to claim 1, in which said one end of said photo-conductive element is exposed at a position on said end surface of said knob at a distance from the center of rotation of said knob.

3. An illumination type rotary variable resistor according to claim 1, in which said driver member is displaced in the direction of thrust together with the displacement of said hollow shaft in the same direction.

4. In a rotary variable resistor having an operation shaft, a rotary knob connected to one end of said operation shaft for rotating said shaft to actuate said variable resistor, and means connected to said operation shaft for actuating a switch mechanism upon axial movement of said operation shaft, the improvement including means for illuminating a portion of said knob for indicating the rotational position thereof, said illuminating means including an elongate light-transmission means extending through said operation shaft and having a first end portion extending eccentrically to the face of said knob and a second end portion extending axially from said operation shaft, a light source adapted to emit light angularly towards said second end portion, and reflection means including a reflective surface adapted to reflect light from said light source towards said second end portion regardless of the axial position of said operation member.

5. A rotary variable resistor according to claim 4, said reflection means including a member contacting said operation shaft and adapted to move axially therewith for operating said switch mechanism.

* * * * *